(12) United States Patent
Shukla et al.

(10) Patent No.: US 10,996,972 B2
(45) Date of Patent: May 4, 2021

(54) MULTI-TENANT SUPPORT ON VIRTUAL MACHINES IN CLOUD COMPUTING NETWORKS

(71) Applicant: Microsoft Technology Licensing, LLC, Redmond, WA (US)

(72) Inventors: Abhishek Shukla, Redmond, WA (US); Abhishek Ellore Sreenath, Karnataka (IN); Neha Aggarwal, Seattle, WA (US); Naveen Prabhat, Redmond, WA (US); Nisheeth Srivastava, Sammamish, WA (US); Xinyan Zan, Sammamish, WA (US); Ashish Bhargava, Sammamish, WA (US); Parag Sharma, Issaquah, WA (US); Rishabh Tewari, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 141 days.

(21) Appl. No.: 16/141,502

(22) Filed: Sep. 25, 2018

(65) Prior Publication Data
US 2020/0097310 A1    Mar. 26, 2020

(51) Int. Cl.
*G06F 9/455* (2018.01)
*H04W 4/50* (2018.01)
(Continued)

(52) U.S. Cl.
CPC .......... *G06F 9/45558* (2013.01); *H04L 12/66* (2013.01); *H04L 63/20* (2013.01);
(Continued)

(58) Field of Classification Search
CPC ............. G06F 9/45533; G06F 9/45558; G06F 9/5072; G06F 9/5077; G06F 2009/45566;
(Continued)

(56) References Cited

U.S. PATENT DOCUMENTS

2013/0145006 A1* 6/2013 Tammam ............. G06F 9/5027
                                                                  709/223
2015/0082301 A1    3/2015 Garg et al.
(Continued)

OTHER PUBLICATIONS

Firestone, Daniel. "VFP: A Virtual Switch Platform for Host SDN in the Public Cloud." Proceedings of the 14th USENIX Symposium on Networked Systems Design and Implementation (NSDI 17). Mar. 27-29, 2017. (Year: 2017).*
(Continued)

*Primary Examiner* — Hermon Asres
*Assistant Examiner* — William C Mcbeth
(74) *Attorney, Agent, or Firm* — Mark K. Young; Mayer & Williams, PC

(57) ABSTRACT

A virtual network interface controller (NIC) associated with a virtual machine in a cloud computing network is configured to support one or more network containers that encapsulate networking configuration data and policies that are applicable to a specific discrete computing workload to thereby enable the virtual machine to simultaneously belong to multiple virtual networks using the single NIC. The network containers supported by the NIC can be associated with a single tenant to enable additional flexibility such quickly switching between virtual networks and support pre-provisioning of additional computing resources with associated networking policies for rapid deployment. The network containers can also be respectively associated with different tenants so that the single NIC can support multi-tenant services on the same virtual machine.

20 Claims, 16 Drawing Sheets

(51) Int. Cl.
  *H04L 12/66*   (2006.01)
  *H04L 29/06*   (2006.01)

(52) U.S. Cl.
  CPC ..... *H04W 4/50* (2018.02); *G06F 2009/45587* (2013.01); *G06F 2009/45595* (2013.01); *H04L 2212/00* (2013.01)

(58) Field of Classification Search
  CPC . G06F 2009/45587; G06F 2009/45595; H04L 63/02; H04L 63/0227; H04L 63/0236; H04L 63/0254; H04L 63/0263; H04L 63/20
  See application file for complete search history.

(56) References Cited

U.S. PATENT DOCUMENTS

| | | | |
|---|---|---|---|
| 2017/0026283 A1* | 1/2017 | Williams | H04L 61/2507 |
| 2017/0170990 A1* | 6/2017 | Gaddehosur | G06F 9/45537 |
| 2018/0027100 A1 | 1/2018 | Jeuk et al. | |
| 2018/0239631 A1 | 8/2018 | Behera et al. | |
| 2018/0262599 A1* | 9/2018 | Firestone | G06F 9/45558 |
| 2018/0329757 A1* | 11/2018 | Patgar | G06F 9/5077 |

OTHER PUBLICATIONS

"International Search Report and Written Opinion Issued in PCT Application No. PCT/US2019/039120", dated Sep. 27, 2019, 12 Pages.

* cited by examiner

MULTI-TENANT SUPPORT ON VIRTUAL MACHINES IN CLOUD COMPUTING NETWORKS

BACKGROUND

A cloud computing environment, also called a "cloud computing network," "distributed computing system," or simply a "cloud," typically provides processing and storage resources on demand from virtual machines over a wide-area network, such as the Internet. The resources provided by the cloud computing network are generally available on demand from shared pools of configurable computing resources such as networks, servers, storage devices, applications, and software services, and the offered resources can typically be rapidly provisioned and released with relatively small management effort from the users. Services from cloud computing networks for compute, networking, and storage give users varied and flexible capabilities to store, communicate, and process their data in third-party datacenters. Users of cloud computing networks are typically referred to as "tenants." In conventional cloud computing, a given virtual machine is associated with a single virtual network. Thus, tenants needing to communicate with different virtual networks need to be supported on different virtual machines. Swapping networks typically involves restarting, rebooting, or creating a new virtual machine which can be time consuming and disruptive to tenant computing operations.

SUMMARY

A virtual network interface controller (NIC) associated with a virtual machine in a cloud computing network is configured to support one or more network containers that encapsulate networking configuration data and policies that are applicable to a specific discrete computing workload to thereby enable the virtual machine to simultaneously belong to multiple virtual networks using the single NIC. The network containers supported by the NIC can be associated with a single tenant to enable additional flexibility such as quickly switching between virtual networks and supporting pre-provisioning of additional computing resources with associated networking policies for rapid deployment. Each network container can also be respectively associated with different tenants so that the single NIC can support multi-tenant services on the same virtual machine. Utilization of a network container enables implementation of desired networking configuration and policies while supporting access to resources on a given network in the same way as a dedicated virtual machine with a connection to the network. However, unlike a conventional virtual machine, the network containers enable granular networking policies to be enforced to a particular discrete computing workload, rather than across the entire virtual machine.

A virtual filtering platform plug-in underlying the NIC is configured to enforce specific networking policies that are tied to each network container. The datapaths for each discrete workload on the virtual machine are isolated from each other to ensure that processing of data packets for one network container has no impact on other network containers. The NIC is also configured to be "floating" in which virtual networking configuration is decoupled from compute operations on the virtual machine. Thus, once a virtual machine is created, network containers can be dynamically created, configured, and deleted as needed to support multi-tenancy, network switching, and network resource pre-provisioning without requiring a restart or creation of a new virtual machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
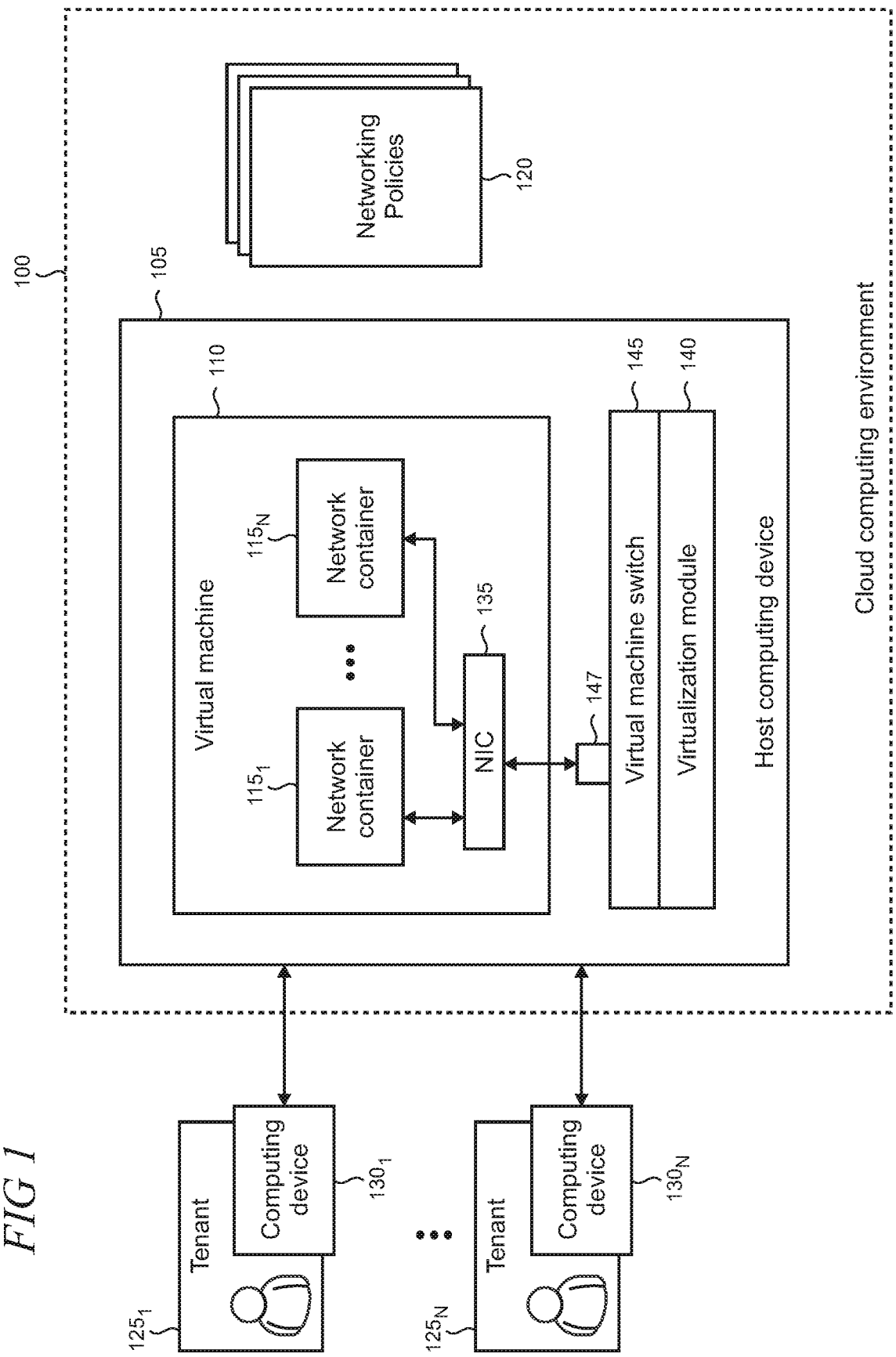
FIG. 1 shows an illustrative cloud computing environment in which a host computing device supports a virtual machine and multiple network containers that are configured to encapsulate networking policies for discrete computing workloads.

FIG. 1 shows an illustrative cloud computing environment 100 in which a host computing device 105 supports a virtual machine 110 and multiple network containers 115$_1$ $_{...N}$ that are configured to encapsulate networking policies 120 and other applicable configurations for particular discrete computing workloads that are associated with each network container. As used herein, a "workload' is an amount of processing that a computing element has been given to perform in a given time period. For example, computing workloads can be processed for policy enforcement for security, isolation, and service level for data packets flowing into and out of a network container on a virtual machine. The host computing device supports multiple tenants 125$_1$ $_{...N}$ in this example that utilize respective client computing devices 130$_1$ $_{...N}$. The tenants shown in FIG. 1 are intended to be illustrative only and another number of tenants may also be supported in a given implementation of the present multi-tenant support on virtual machines in cloud computing networks.

A network interface controller (NIC) 135 that provides identity, connectivity, and discoverability for the virtual machine 110 is associated with the virtual machine. The NIC 135 is typically implemented virtually, although physical embodiments may be utilized in some scenarios. The NIC is supported on the host computing device 105 by a virtualization module 140 that operates with the NIC through a network switch that may be implemented as a virtual machine switch 145. The virtual machine switch is operated on the host and may support multiple virtual machines (not shown). The virtual machine switch provides a port (representatively indicated by reference numeral 147) to each virtual machine so that each may have its own NIC. For example, the virtualization module may be implemented as a hypervisor in computer software, firmware, hardware, or combinations thereof. Each network connection to the virtual machine switch is represented by a port (not shown). The virtual machine switch, in this illustrative example, is configured as software-based layer-2 Ethernet network switch that includes programmatically managed and extensible capabilities, and which is configured to connect to both the network containers on the virtual machine and underlying physical networking infrastructure. The switch typically creates and configures a port before a network connection is made. After a network connection is torn down, the switch may delete the port or reuse it for another connection. As discussed in more detail below, data packets representing a given computing workload are processed by an extension to the virtual machine switch to enforce applicable networking policies.

Figure 2:
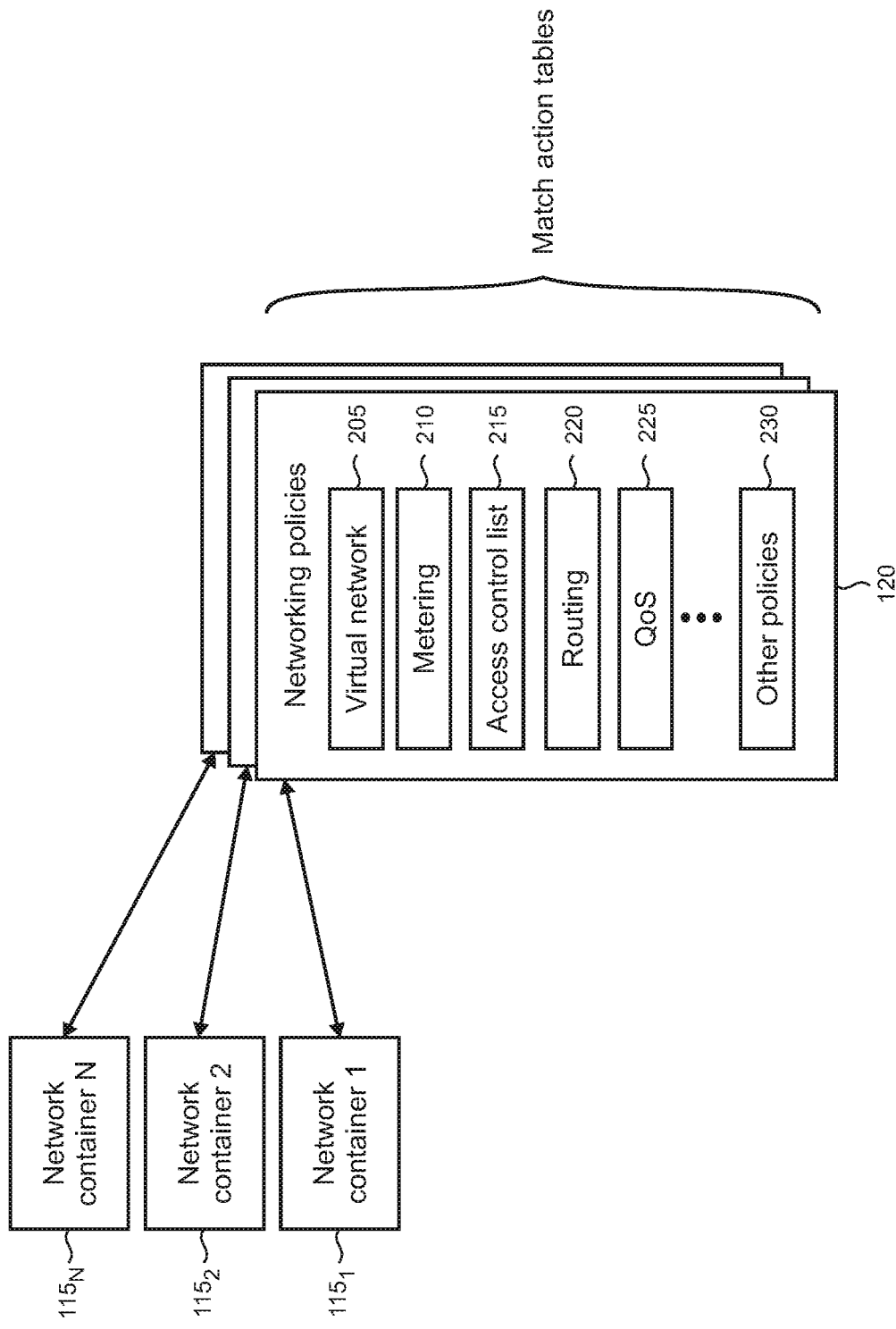
FIG. 2 shows illustrative networking policies that may be encapsulated in network containers.

The NIC 135 operates with a plug-in to the virtual machine switch (described in detail below) to enforce the networking policies 120 per network container 115 for packet traffic over the port. Thus, the networking policies are applied to the computing workload associated with each network container that needs to be networked in the virtual machine 110. Policies can affect various behaviors of the computing workload such as network access and routing. As shown in FIG. 2, networking policies are arranged in layers that essentially form match action tables that network controllers typically use to specify policy. The match action tables can be created and managed separately by different controllers. The match action table model used for policy enforcement as data packets are processed is illustrative, and other policy enforcement and processing models may also be utilized to meet the requirements of a particular implementation of the present multi-tenant support on virtual machines in cloud computing networks.

The networking policies 120 can illustratively include data that is associated with a tenant's virtual network 205, metering 210, access control list (ACL) 215, routing 220, quality of service (QoS) 225, and various other policies 230. Other illustrative policies that may be utilized for a given implementation may deal with tunneling, filtering, address translation, encryption, decryption, encapsulation, and/or de-encapsulation. The policies shown in FIG. 2 are intended to be illustrative, the particular order of the policies shown in FIG. 2 is arbitrary and does not imply priority or importance, and other policies can be utilized to meet the needs of a particular implementation. Instances of policies are mapped to each of the network containers 115 and the policies can be different for each network container.

By associating a different network container 115 to each computing workload, granular networking policies are enforced for each of the computing workloads hosted on the virtual machine 110 in the cloud computing environment 100 (FIG. 1). The NIC thus enables hosting of multiple network containers without having an independent policy of its own. For example, in the case of serverless computing, a function execution may be assigned to a specific host computing device which could also be utilized for hosting computing workloads associated with other tasks. Each of the computing workloads requires access to resources in its own virtual network while also providing isolation between different computing workloads on the host computing device.

While isolation between different computing workloads within the virtual machine and host computing device can be achieved through different isolation techniques at the operating system (OS) level, networking connectivity to external resources still needs to adhere to the policies on the virtual machine. With network container abstraction, it therefore becomes possible to dynamically allocate a network container to a host computing device and map it to the appropriate computing workload. Therefore, the network container can access all the resources in its virtual network in a similar manner as if it were running on a dedicated virtual machine connected to that particular virtual network. By providing isolation for computing workloads for multiple tenants on the same host, the network containers enable highly efficient utilization of network infrastructure. For example, a single virtual machine can dynamically and flexibly support premise connectivity to multiple virtual networks and thereby reduce costs. Without the network container abstraction, a cloud computing network provider would ordinarily need to deploy multiple virtual machines in separate virtual networks to implement the desired isolation.

Figure 3:
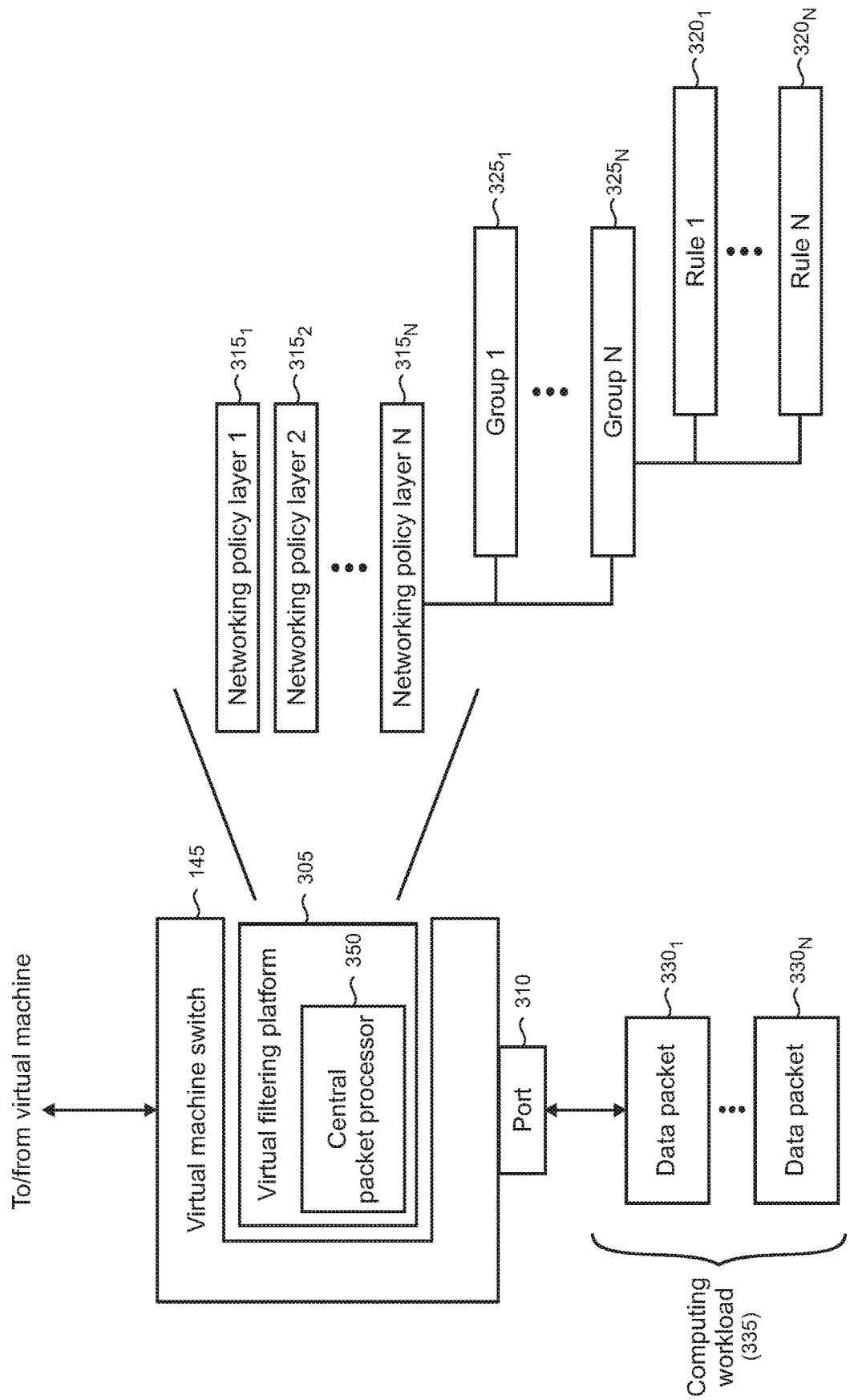
FIG. 3 shows an illustrative virtual filtering platform extension to a virtual machine switch that divides a network port policy into layers having multiple rules that are organized in groups.

FIG. 3 shows an illustrative virtual filtering platform 305 that is configured as an extension, or plug-in, to the virtual machine switch 145 that divides network policy applicable to a networking port 310 into layers 315 that include rules 320 that are organized in groups 325. The virtual filtering platform provides capabilities to enforce policies and transform or tunnel data packets 330 in a computing workload 335 that are entering and leaving the virtual machine. The virtual filtering platform includes a central data packet processor 350 that perform the processing of data packets that are inbound and outbound from a virtual machine, as shown in FIGS. 4 and 5 and described in the accompanying text.

Figure 4:
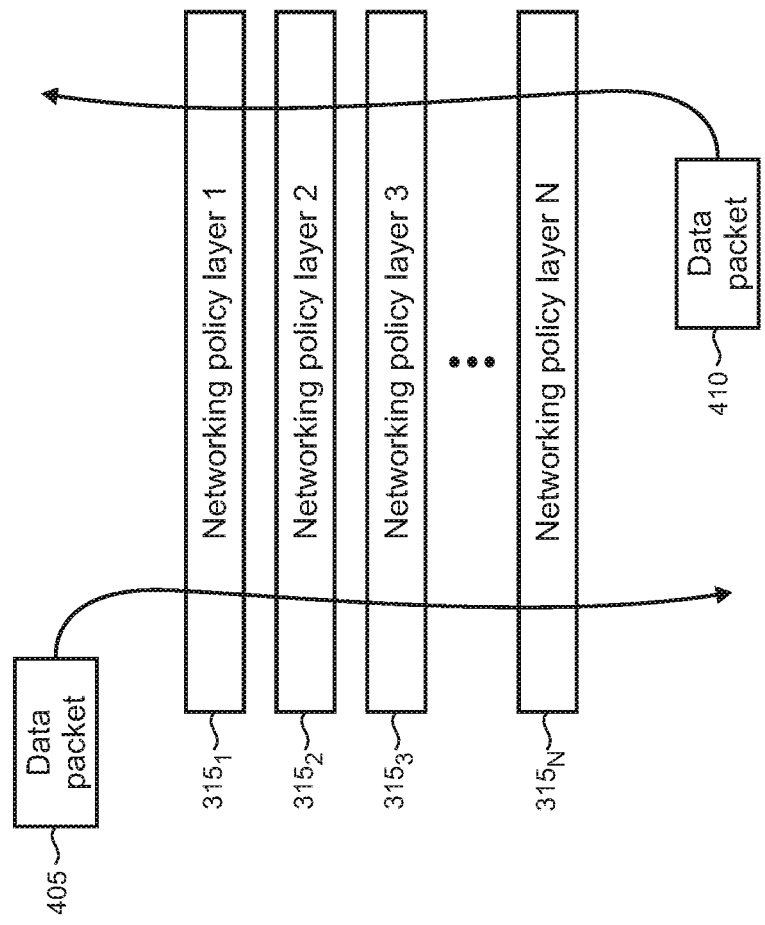
FIG. 4 illustratively shows how a data packet entering and exiting a virtual machine traverse layers which impart various actions during processing of the data packet.
Figure 5:
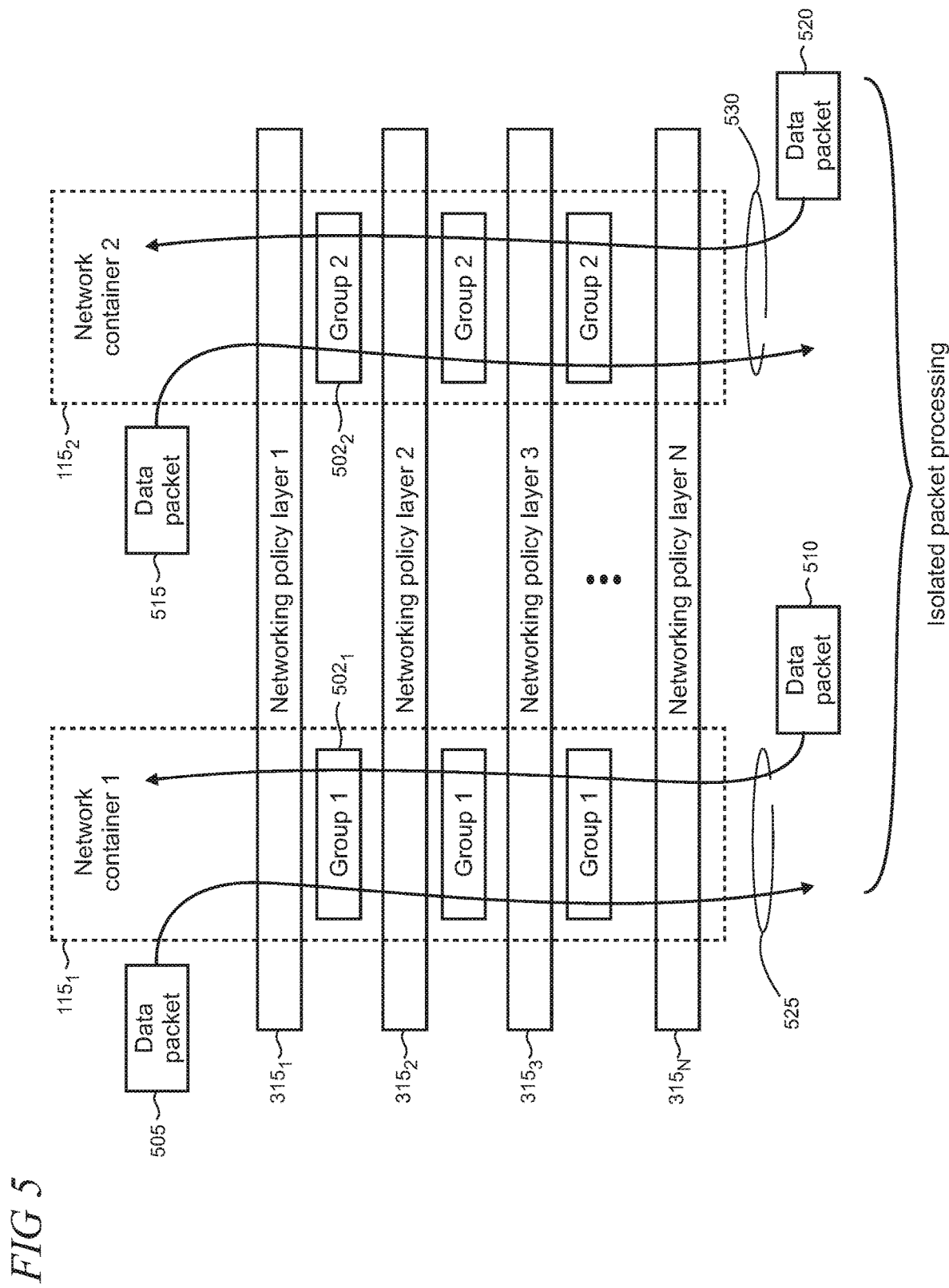
FIG. 5 shows illustrative processing of data packets on a separate, or per-network container basis.

FIG. 4 illustratively shows how a data packet entering and exiting a virtual machine traverse layers which impart various actions during processing of the data packet. Data packets 405 entering the virtual machine are processed by the virtual filtering platform's packet processor (not shown in FIG. 4) by evaluating the data packets as they traverse the networking policy layers 315 one by one, matching rules in each layer based on a state of the packet after an action is performed in the preceding layer. Returning packets 410 traverse the layers in the opposite direction and are processed by the virtual filtering platform to match the applicable rules. The rules used to express the networking policies are entities that perform actions on matching packets in the match action table model as the computing workload is processed by the virtual filtering platform plug-in.

The abstraction needed for the network containers may be implemented by use of programming constructs that are organized by group for each network container. That is, as shown in FIG. 5, each of the networking policy layers 315 are commonly shared by the network containers 115. Within the networking policy layers are corresponding groups (representatively indicated by reference numerals $502_1$ and $502_2$) that are unique to each network container. Thus, in the example shown in FIG. 5, the members of group 1 map to network container 1, and those in group 2 map to network container 2, and the groups do not overlap or intersect. The data packet processing by group ensures that the processing is isolated for each network container using independent datapaths 525 and 530. Conditions defined in each group enable packets associated with a given network container to reach their corresponding groups. Therefore, the programming for one network container does not have an affect on any other network container.

As with the computing workload processing shown in FIG. 4, entering data packets 505 for network container 1 traverse each group, layer by layer, to thereby match rules specified therein. Returning packets 510 traverse each group by layer in the opposite direction. Similarly, for network container 2, entering data packets 515 go through the groups, layer by layer, and returning data packets 520 traverse the groups, layer by layer in the opposite direction. The group conditions are unique across the network containers associated with the NIC. This may be achieved either by ensuring unique IP (Internet protocol) addresses across all the network containers or through a combination of IP address and network ID (e.g., virtual local area network (VLAN) tag, etc.). When a combination of IP address and network ID is utilized, IP addresses can overlap across network containers. The network ID and/or IP address can be programmed on the virtual machine switch 145 (FIG. 1) to direct data packet traffic to the associated computing workload in the virtual machine.

Figure 6:
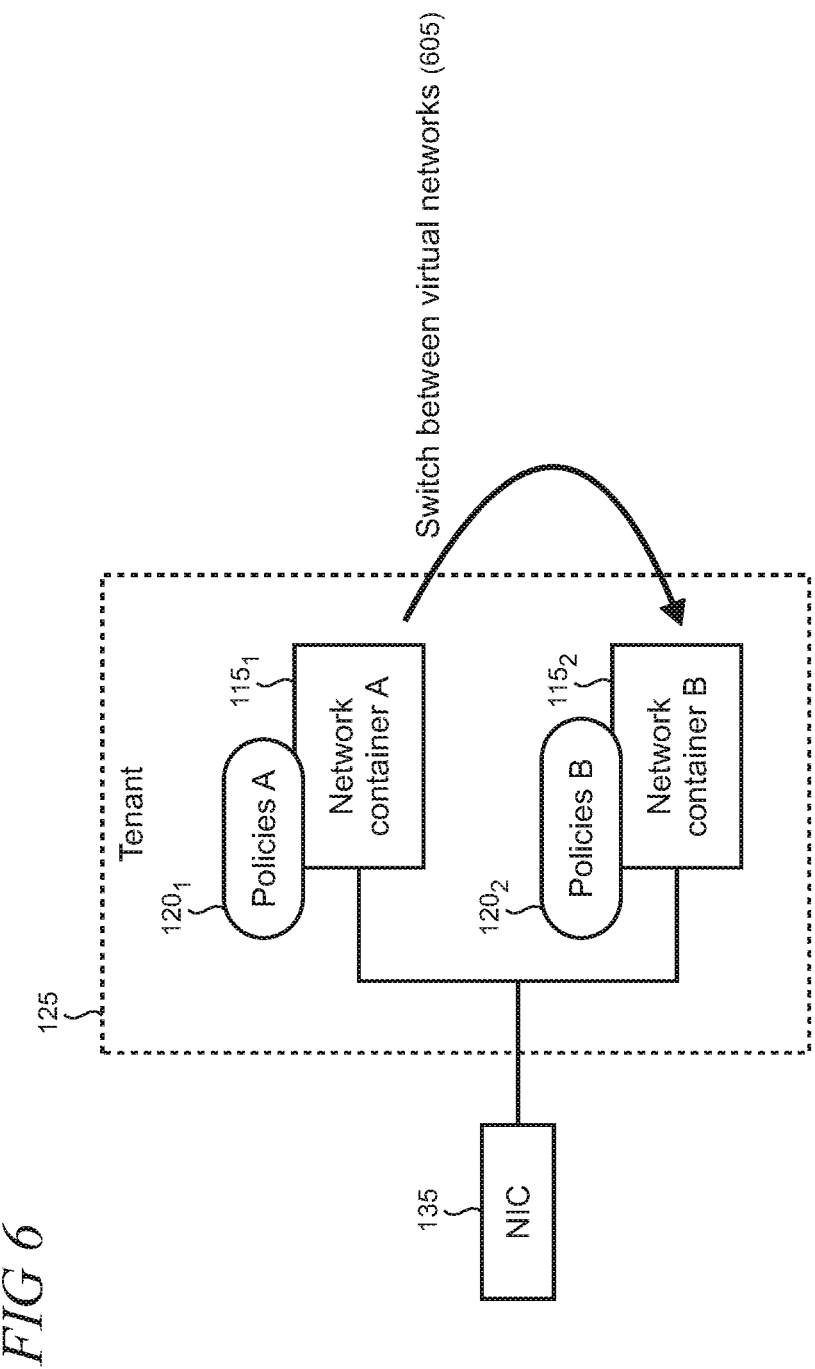
FIG. 6 shows an illustrative use case in which a single NIC enables a tenant to use network containers to dynamically switch between virtual networks.

FIG. 6 shows an illustrative use case in which the single NIC 135 enables a tenant 125 to use network containers 115 to dynamically switch between virtual networks (as indicated by reference numeral 605) on the same virtual machine. The tenant may wish to access another virtual network, for example, to connect to different resources or provide different services where each network is subject to its own networking policies 120. Thus, network container A can be mapped to networking policies A that are enforced for one virtual network, while network container B can be mapped to networking policies B that are enforced for another virtual network.

The use of network containers on a single NIC enables the tenant to switch between networks dynamically on the fly, without having to restart the virtual machines supporting the network containers or create a new virtual machine. In many computing scenarios, such dynamic switching can be beneficial as minimization of wait or down time can be important. For example, tenants involved in electronic-commerce, finance, and other customer-service-oriented activities generally require fast and responsive networking and computing infrastructure to support satisfactory user experiences.

Figure 7:
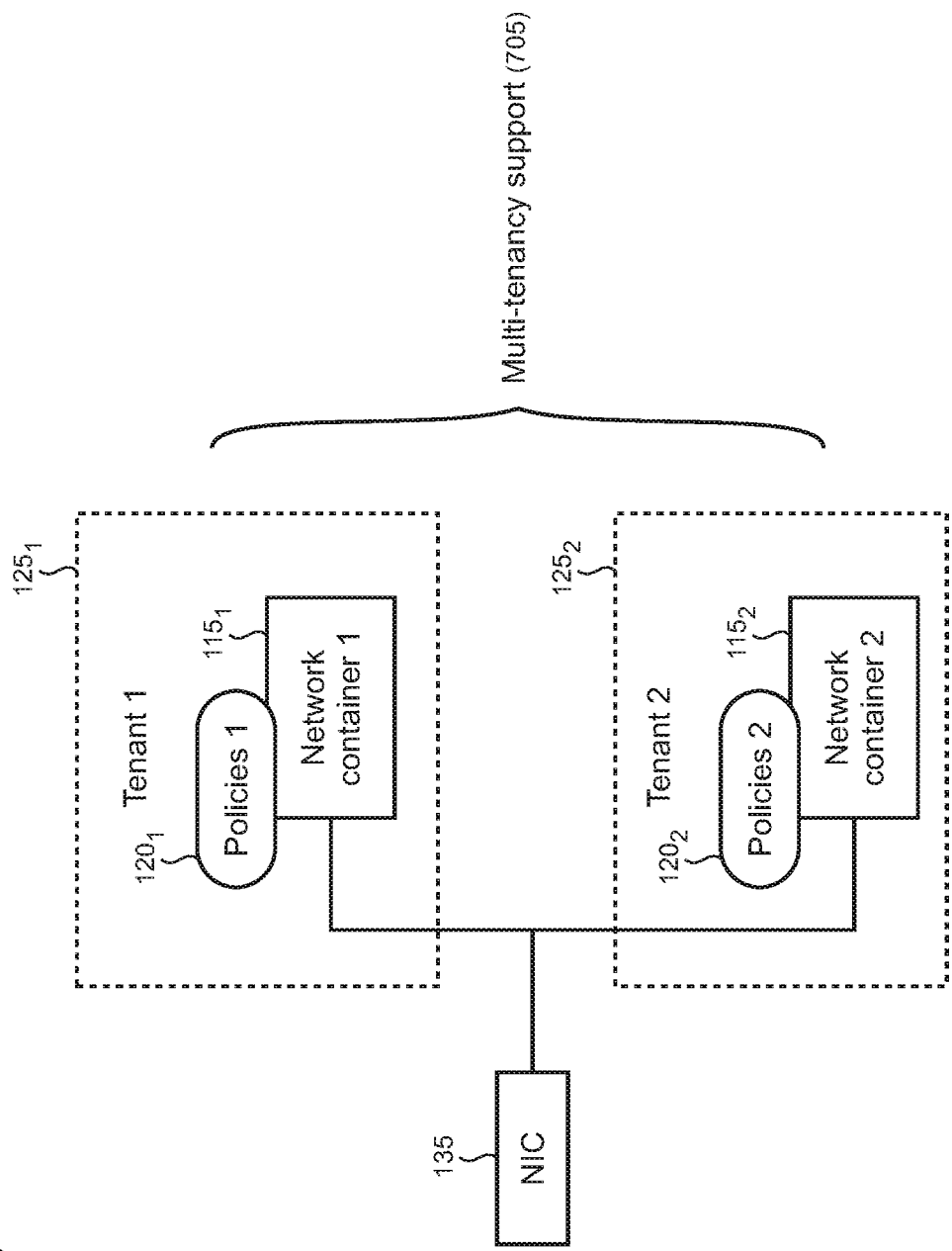
FIG. 7 shows an illustrative use case in which a single NIC supports multi-tenancy on a single virtual machine using different network containers and associated networking policies.

FIG. 7 shows an illustrative use case in which a single NIC 135 supports multi-tenancy (as indicated by reference numeral 705) using different network containers 115 and associated networking policies 120. As discussed above, the NIC 135 may be configured to support multiple different network containers that each encapsulate their own unique networking policies. The network containers enable multiple tenants to share the same virtual machine, and apply their own networking policies, while ensuring that computing workload processing is completely isolated between the tenants. To the tenants, the sharing of the virtual machine is transparent, and the computing workload processing appears as if it were handled on its own dedicated virtual machine. In addition, network containers can be configured to implement any level of functionality that is conventionally provided by a virtual machine from completely isolated virtual machines (e.g., Hyper-v containers) and operating system virtualizations (e.g., Docker containers), to Windows® compartments, and user mode processes.

Figure 8:
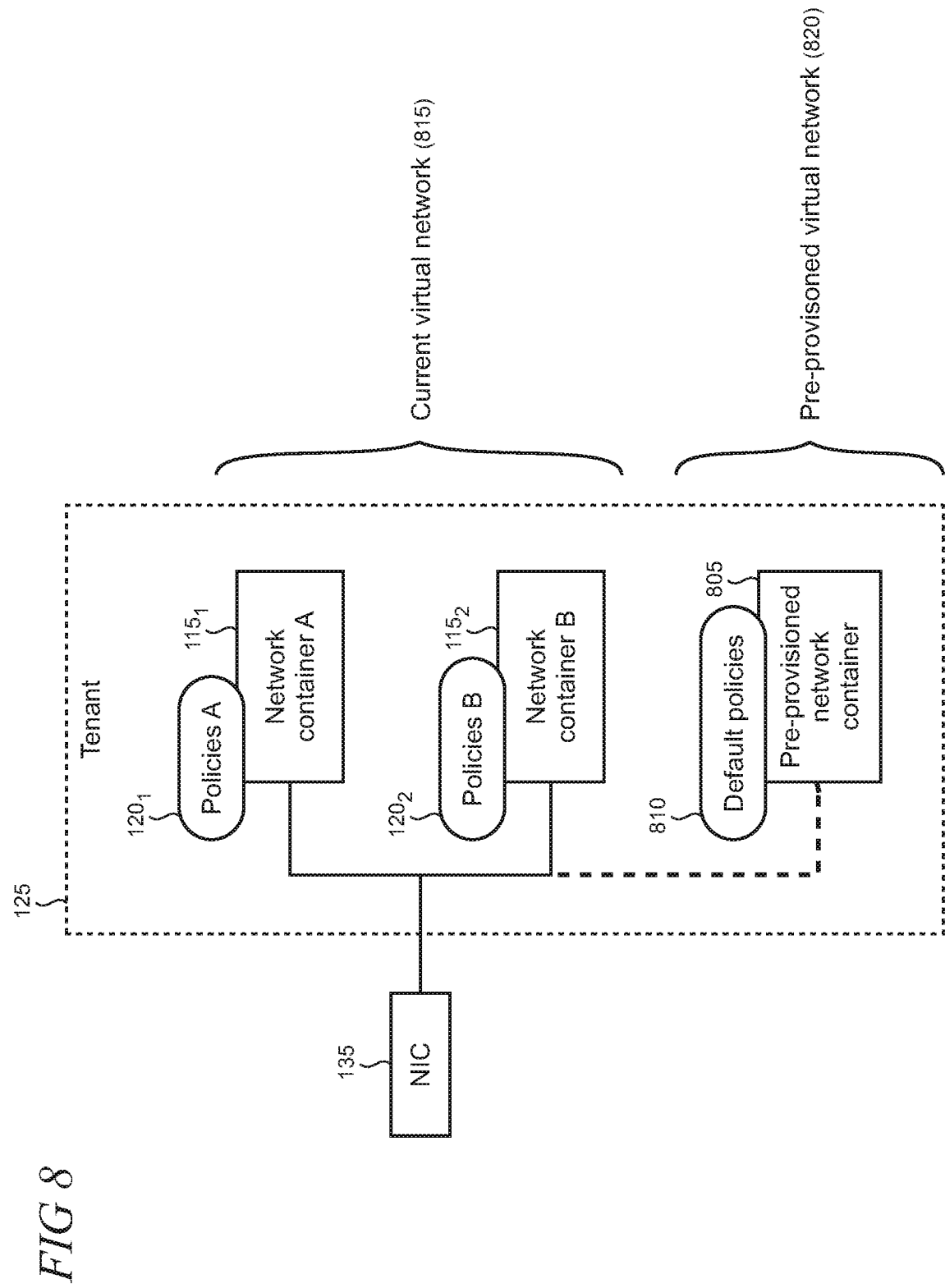
FIG. 8 shows an illustrative use case in which a network container and associated networking policies are pre-provisioned to enable rapid and dynamic provisioning of additional computing resources.

FIG. 8 shows an illustrative use case in which a network container 805 and associated networking policies 810 are pre-provisioned (as indicated by reference numeral 820) to enable rapid and dynamic provisioning of additional computing resources. In this example, a tenant 125 may have network containers 115 and associated networking policies 120 online to provide a current virtual networking capability (as indicated by reference numeral 815). Such current capability can be augmented as needed with additional virtual networking capability. For example, the tenant may need to scale capability up and down with changing demand from customers in electronic commerce or customer-service scenarios.

By pre-provisioning a network container with some default or other pre-determined networking policies, the tenant 125 can quickly bring on additional virtual networking resources without impacting the underlying virtual machine and the current operations and processing that it is supporting. Such pre-provisioning can provide increased flexibility and benefits to the tenant by enabling virtual network resources to be dynamically and rapidly scaled to current computing resource demands. In addition, such dynamic provisioning can be particularly well suited to short-lived computing workload scenarios, such as those using serverless computing, in which functions are deployed in a container that is started, for example, when a specific event is triggered. Such functions are ephemeral by persisting only for a limited duration and then ceasing to exist upon completion. Batch-processed workloads can likewise access resources in a given virtual network supported by a network container for some short duration computation.

Figure 9:
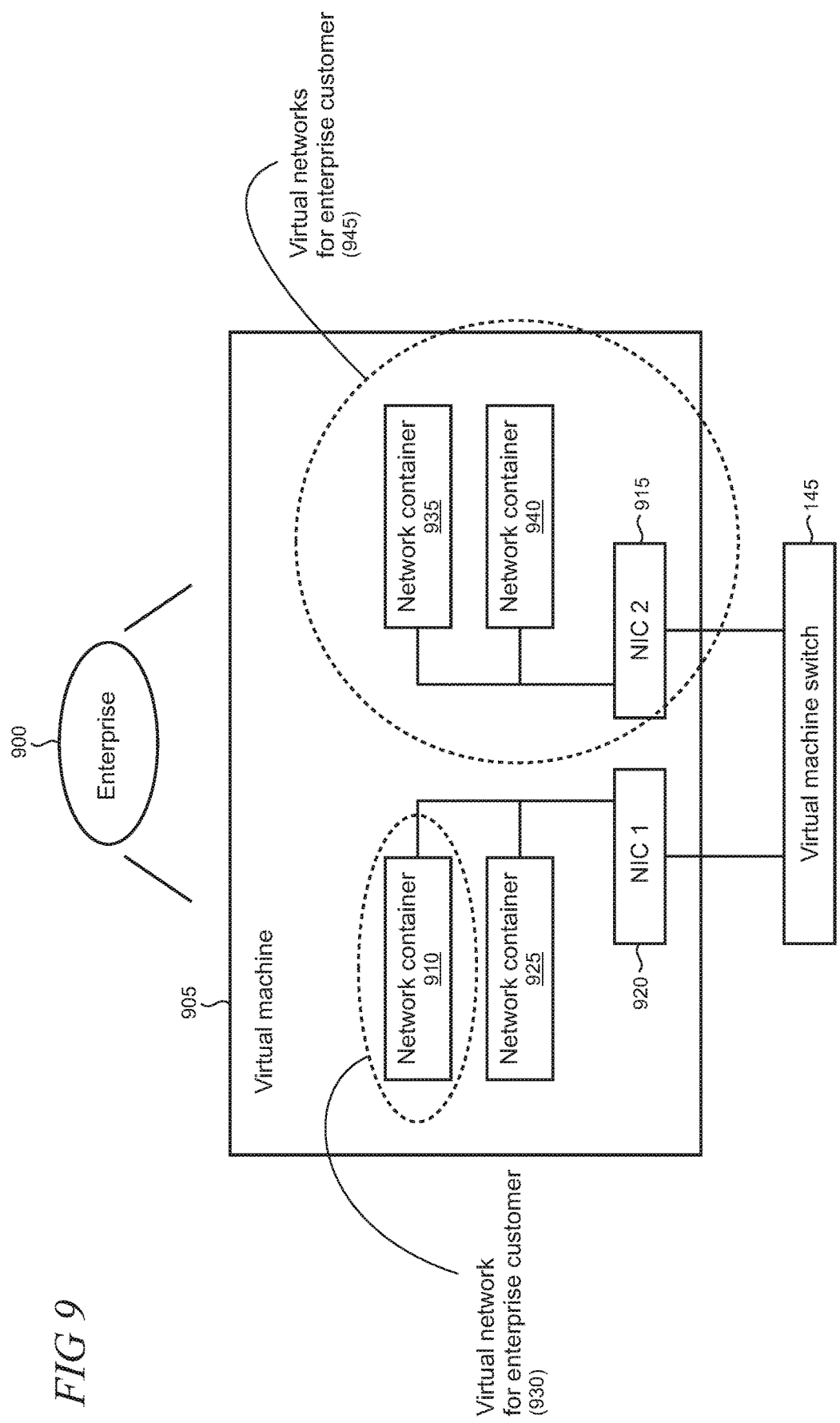
FIG. 9 shows an illustrative use case in which an enterprise can provide a virtual network to a customer by way of a network container or a separate NIC.

FIG. 9 shows an illustrative use case in which an enterprise 900 can provide a virtual network to a customer by way of a network container 910 or a separate NIC 915. In this scenario, a tenant such as an enterprise or other business entity uses a virtual machine 905 and desires to provide virtual networking resources to one of its customers. The enterprise can allocate one of the network containers 910 and associated networking policies (not shown) on a NIC 920 to its customer to thereby provide a virtual network (as indicated by reference numeral 930), while keeping another network container 925 for its own use. For example, NIC 920 can be configured to perform management operations through a connection to a controller that transmits provisioning commands to the customer network container 910.

Alternatively, the virtual machine 905 can be configured with a second NIC 915 that supports its own network containers 935 and 940 and associated networking policies (not shown). The enterprise 900 can then allocate one or more of the network containers 935 and 940 to the customer to thereby provide one or more virtual networks to its customer (as indicated by reference numeral 945). In these scenarios all the aforementioned benefits of isolation, flexibility, and granular networking policy application by computing workload are still applicable to the virtual networks of both the enterprise and its customer.

Figure 10:
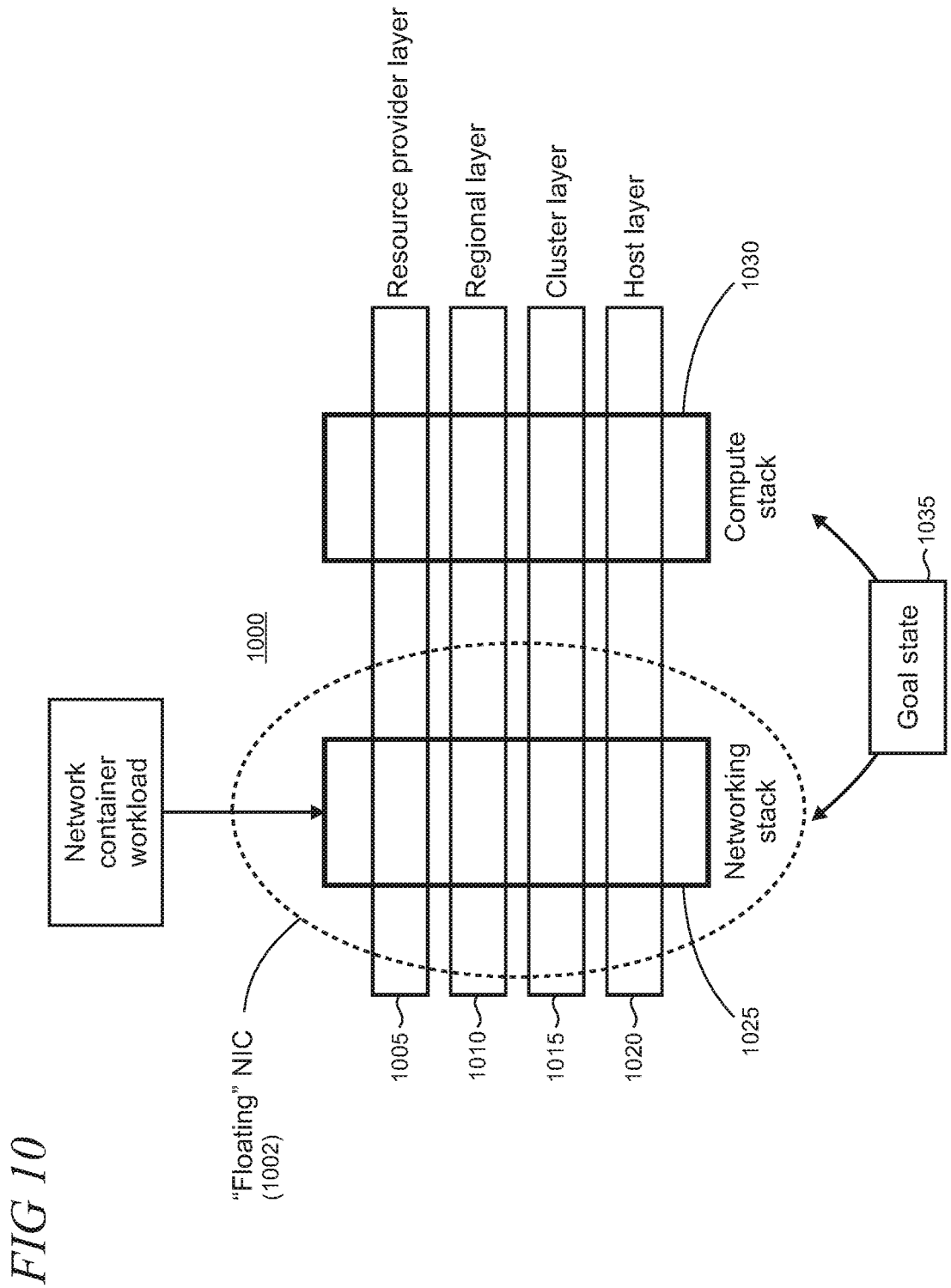
FIG. 10 shows an illustrative cloud computing architecture that is arranged to support a "floating" NIC in which interactions between networking and compute stacks are minimized so that tenant network container data may be processed without impacting operations of the underlying virtual machine.

FIG. 10 shows an illustrative cloud computing architecture 1000 that is arranged to support a "floating" NIC 1002 in which interactions between networking and compute stacks are minimized so that tenant network container data may be processed without impacting ongoing operations of the underlying virtual machine. Here, the cloud computing architecture that supports a virtual machine is arranged in layers including a resource provider layer 1005, regional layer 1010, cluster layer 1015, and host layer 1020. The architecture shown in FIG. 10 is illustrative and can vary according to the requirements of a particular implementation of the present multi-tenant support on virtual machines in cloud computing networks.

In conventional cloud computing that use virtual machines, the architecture 1000 is configured using a networking stack 1025 and compute stack 1030 (a storage stack, not shown, may also be implemented in typical scenarios). The networking stack handles network configuration and the compute stack handles operations associated with creating a virtual machine. Processes are implemented between the networking and compute stacks to work towards a desired goal state 1035 for the NIC and virtual machine. With the floating NIC, the network container computing workload is handled by the networking stack 1025 with minimum interactions with the compute stack 1030. Once a virtual machine is created, the decoupling of processing enables computing workload for networking activities to be performed in the networking stack without further involving the compute stack.

Figure 11:
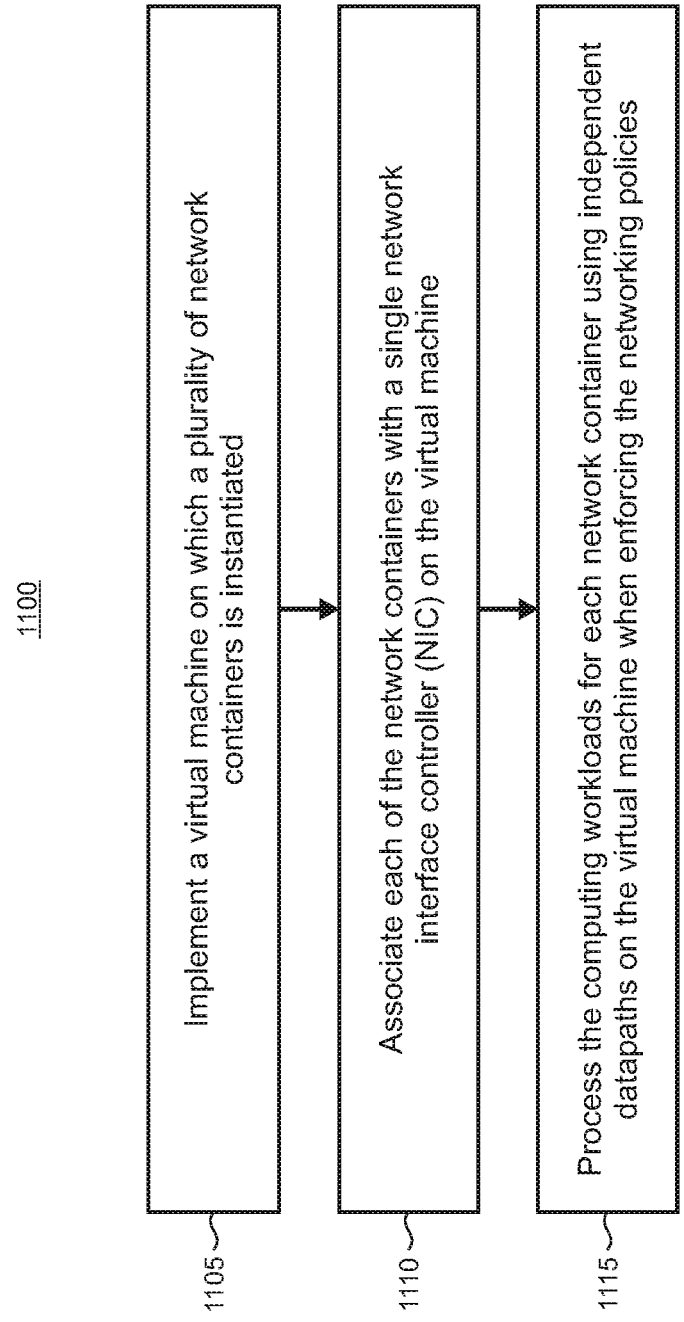
FIGS. 11, 12, and 13 show illustrative methods that may be performed when implementing the present multi-tenant support on virtual machines in cloud computing networks.

FIG. 11 is a flowchart of an illustrative method 1100 that may be performed by a computing system when implementing the present multi-tenant support on virtual machines in cloud computing networks. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1105, a virtual machine is implemented on which a plurality of network containers is instantiated. Each of the network containers encapsulates networking policies that are applicable to computing workloads hosted on the virtual machine. The computing workloads are mapped to the network containers. In step 1110, each of the network containers is associated with a single NIC on the virtual machine. In step 1115, the computing workloads are processed for each network container using independent datapaths on the virtual machine when enforcing the networking policies.

Figure 12:
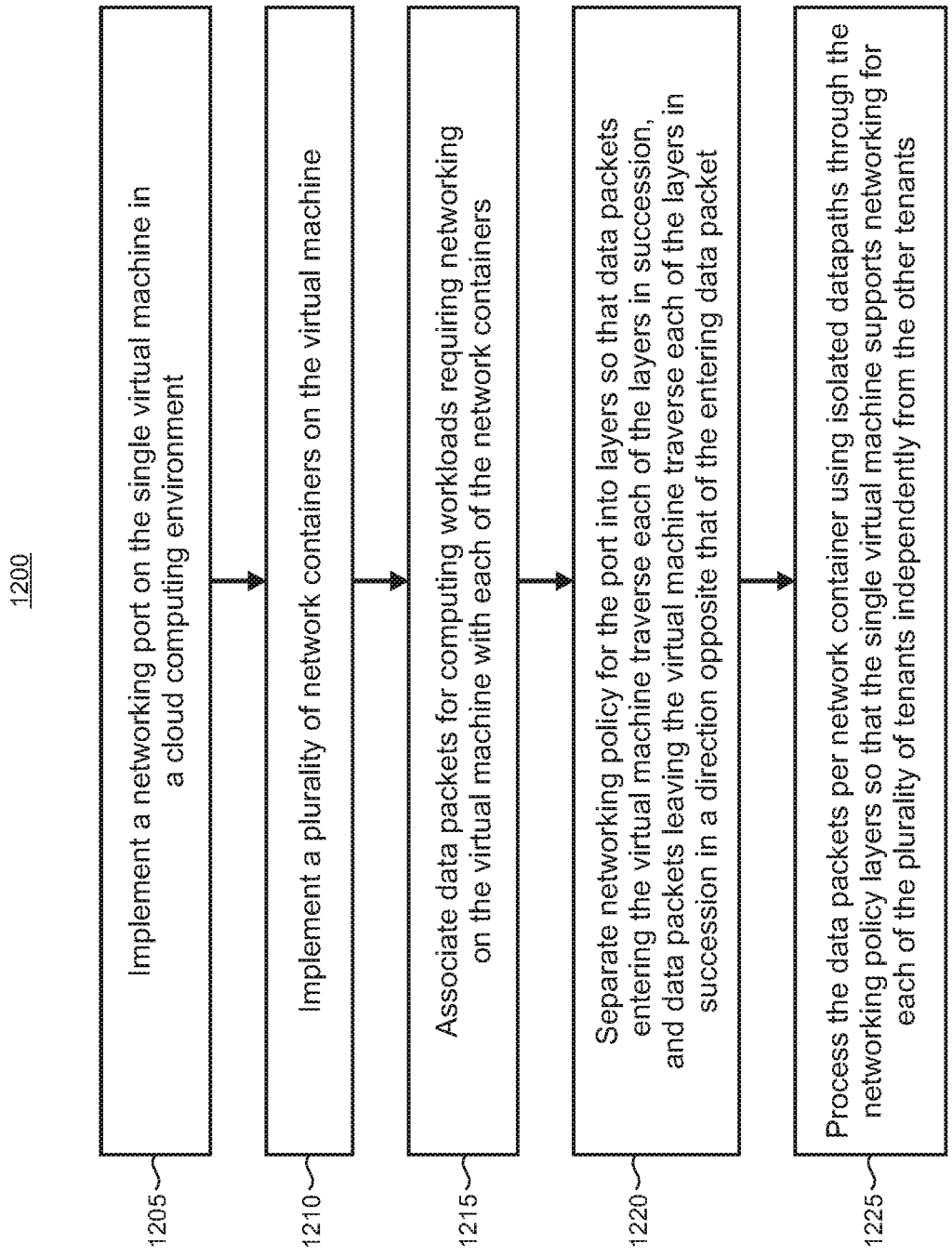

FIG. 12 is a flowchart of an illustrative method 1200 for supporting a multi-tenant cloud computing environment on a single virtual machine. In step 1205, a networking port is implemented on the single virtual machine in a cloud computing environment. In step 1210, a plurality of network containers is implemented on the virtual machine, in which the network containers are respectively associated with a plurality of tenants of the single virtual machine. In step 1215, data packets for computing workloads requiring networking on the virtual machine are associated with each of the network containers. Each network container includes networking policy for the respective computing workload. In step 1220, networking policy for the port is separated into layers so that data packets entering the virtual machine traverse each of the layers in succession, and data packets leaving the virtual machine traverse each of the layers in succession in a direction opposite that of the entering data packets. In step 1225, data packets are processed per network container using isolated datapaths through the networking policy layers so that the single virtual machine supports networking for each of the plurality of tenants independently from the other tenants.

Figure 13:
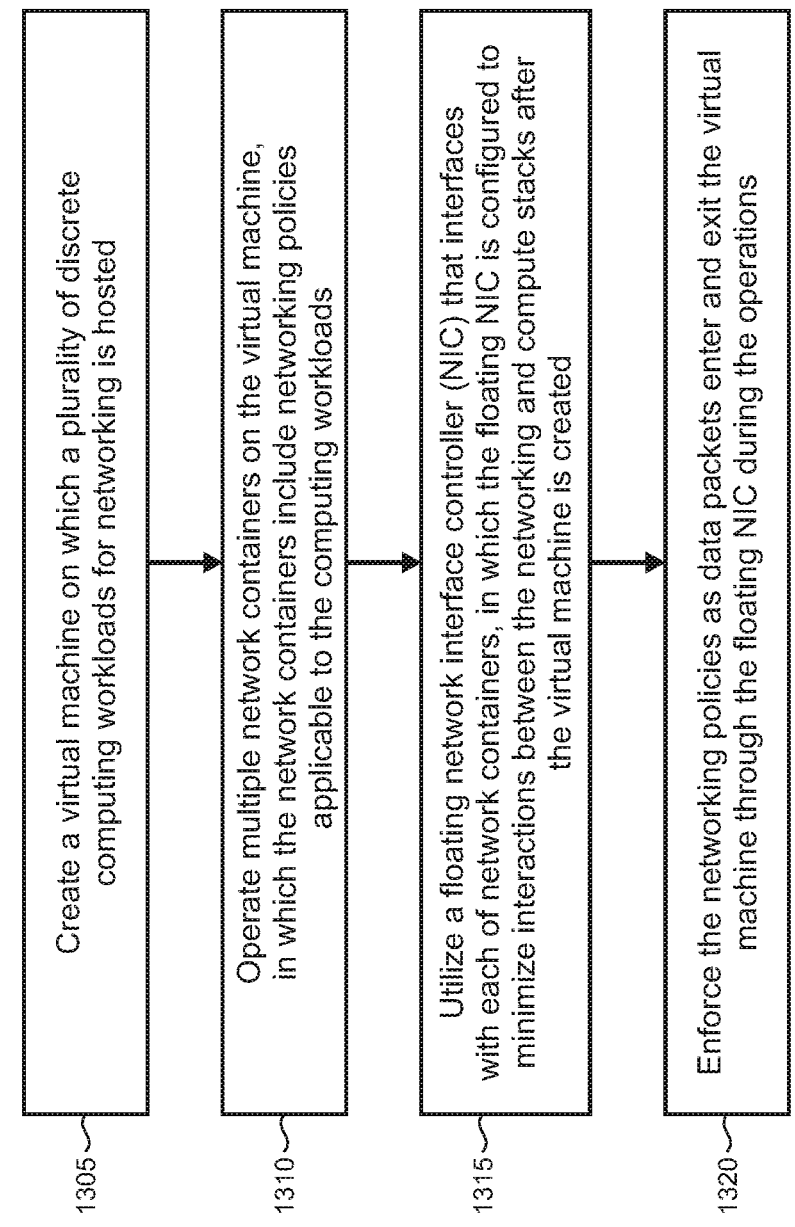

FIG. 13 is a flowchart of an illustrative method 1300 that may be performed by a computer server when implementing the present multi-tenant support on virtual machines in cloud computing networks. In step 1305, a virtual machine is created on which a plurality of discrete computing workloads for networking is hosted. The virtual machine utilizes at least a networking stack and compute stack during operations. In step 1310, multiple network containers are operated on the virtual machine. The network containers include networking policies applicable to the computing workloads. In step 1315, a floating NIC is utilized that interfaces with each of the network containers. The floating NIC is configured to minimize interactions between the networking and compute stacks after the virtual machine is created. In step 1320, the networking policies are enforced as data packets enter and exit the virtual machine through the floating NIC during the operations.

Figure 14:
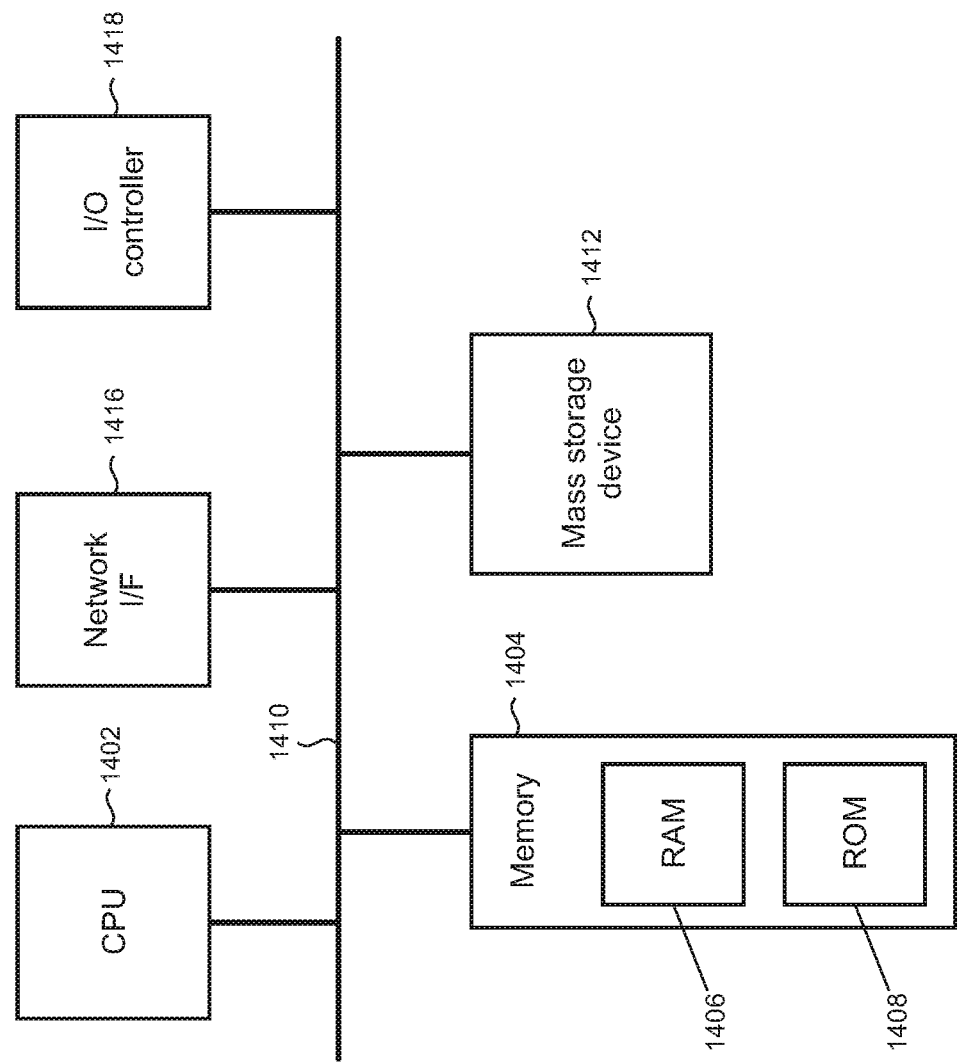
FIG. 14 is a block diagram of an illustrative server that may be used at least in part to implement the present multi-tenant support on virtual machines in cloud computing networks.

FIG. 14 shows an illustrative architecture 1400 for a device, such as a server, capable of executing the various components described herein for multi-tenant support on virtual machines in cloud computing networks. The architecture 1400 illustrated in FIG. 14 includes one or more processors 1402 (e.g., central processing unit, dedicated AI chip, graphic processing unit, etc.), a system memory 1404, including RAM (random access memory) 1406 and ROM (read only memory) 1408, and a system bus 1410 that operatively and functionally couples the components in the architecture 1400. A basic input/output system containing the basic routines that help to transfer information between elements within the architecture 1400, such as during startup, is typically stored in the ROM 1408. The architecture 1400 further includes a mass storage device 1412 for storing software code or other computer-executed code that is utilized to implement applications, the file system, and the operating system. The mass storage device 1412 is connected to the processor 1402 through a mass storage controller (not shown) connected to the bus 1410. The mass storage device 1412 and its associated computer-readable storage media provide non-volatile storage for the architecture 1400. Although the description of computer-readable storage media contained herein refers to a mass storage device, such as a hard disk or CD-ROM drive, it may be appreciated by those skilled in the art that computer-readable storage media can be any available storage media that can be accessed by the architecture 1400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1400.

According to various embodiments, the architecture 1400 may operate in a networked environment using logical connections to remote computers through a network. The architecture 1400 may connect to the network through a network interface unit 1416 connected to the bus 1410. It may be appreciated that the network interface unit 1416 also may be utilized to connect to other types of networks and remote computer systems. The architecture 1400 also may include an input/output controller 1418 for receiving and processing input from a number of other devices, including a keyboard, mouse, touchpad, touchscreen, control devices such as buttons and switches or electronic stylus (not shown in FIG. 14). Similarly, the input/output controller 1418 may provide output to a display screen, user interface, a printer, or other type of output device (also not shown in FIG. 14).

It may be appreciated that the software components described herein may, when loaded into the processor 1402 and executed, transform the processor 1402 and the overall architecture 1400 from a general-purpose computing system into a special-purpose computing system customized to facilitate the functionality presented herein. The processor 1402 may be constructed from any number of transistors or other discrete circuit elements, which may individually or collectively assume any number of states. More specifically, the processor 1402 may operate as a finite-state machine, in response to executable instructions contained within the software modules disclosed herein. These computer-executable instructions may transform the processor 1402 by specifying how the processor 1402 transitions between states, thereby transforming the transistors or other discrete hardware elements constituting the processor 1402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like.

For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1400 in order to store and execute the software components presented herein. It also may be appreciated that the architecture 1400 may include other types of computing devices, including wearable devices, handheld computers, embedded computer systems, smartphones, PDAs, and other types of computing devices known to those skilled in the art. It is also contemplated that the architecture 1400 may not include all of the components shown in FIG. 14, may include other components that are not explicitly shown in FIG. 14, or may utilize an architecture completely different from that shown in FIG. 14.

Figure 15:
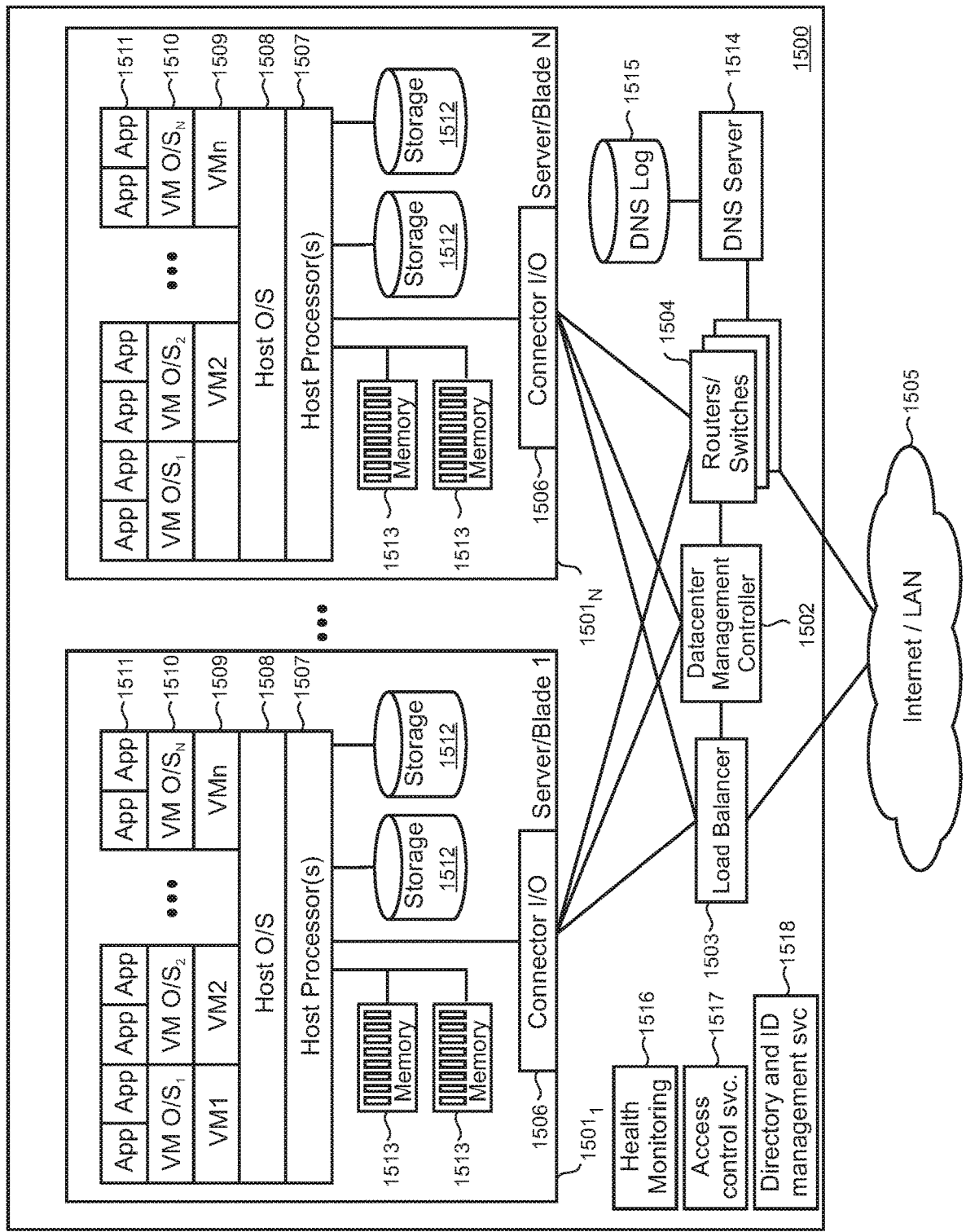
FIG. 15 is a block diagram of an illustrative datacenter that may be used at least in part to implement the present multi-tenant support on virtual machines in cloud computing networks.

FIG. 15 is a high-level block diagram of an illustrative datacenter 1500 that provides cloud computing services or distributed computing services that may be used to implement the present multi-tenant support on virtual machines in cloud computing networks. Datacenter 1500 may incorporate the features disclosed in FIGS. 1-10. A plurality of servers 1501 are managed by datacenter management controller 1502. Load balancer 1503 distributes requests and computing workloads over servers 1501 to avoid a situation wherein a single server may become overwhelmed. Load balancer 1503 maximizes available capacity and performance of the resources in datacenter 1500. Routers/switches 1504 support data traffic between servers 1501 and between datacenter 1500 and external resources and users (not shown) via an external network 1505, which may be, for example, a local area network (LAN) or the Internet.

Servers 1501 may be standalone computing devices, and/or they may be configured as individual blades in a rack of one or more server devices. Servers 1501 have an input/output (I/O) connector 1506 that manages communication with other database entities. One or more host processors 1507 on each server 1501 run a host operating system (O/S) 1508 that supports multiple virtual machines (VM) 1509. Each VM 1509 may run its own O/S so that each VM O/S 1510 on a server is different, or the same, or a mix of both. The VM O/Ss 1510 may be, for example, different versions of the same O/S (e.g., different VMs running different current and legacy versions of the Windows® operating system). In addition, or alternatively, the VM O/Ss 1510 may be provided by different manufacturers (e.g., some VMs running the Windows® operating system, while other VMs are running the Linux® operating system). Each VM 1509 may also run one or more applications (App) 1511. Each server 1501 also includes storage 1512 (e.g., hard disk drives (HDD)) and memory 1513 (e.g., RAM) that can be accessed and used by the host processors 1507 and VMs 1509 for storing software code, data, etc. In one embodiment, a VM 1509 may employ the data plane APIs as disclosed herein.

Datacenter 1500 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1500 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1509 on server 1501$_1$ to run their applications 1511. When demand for an application 1511 increases, the datacenter 1500 may activate additional VMs 1509 on the same server 1501$_1$ and/or on a new server 1501N as needed. These additional VMs 1509 can be deactivated if demand for the application later drops.

Datacenter 1500 may offer guaranteed availability, disaster recovery, and back-up services. For example, the datacenter may designate one VM 1509 on server 1501$_1$ as the primary location for the tenant's application and may activate a second VM 1509 on the same or a different server as a standby or back-up in case the first VM or server 1501$_1$ fails. Database manager 1502 automatically shifts incoming user requests from the primary VM to the back-up VM without requiring tenant intervention. Although datacenter 1500 is illustrated as a single location, it will be understood that servers 1501 may be distributed to multiple locations across the globe to provide additional redundancy and disaster recovery capabilities. Additionally, datacenter 1500 may be an on-premises, private system that provides services to a single enterprise user or may be a publicly accessible, distributed system that provides services to multiple, unrelated customers and tenants or may be a combination of both.

Domain Name System (DNS) server 1514 resolves domain and host names into IP addresses for all roles, applications, and services in datacenter 1500. DNS log 1515 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1516 monitors the health of the physical systems, software, and environment in datacenter 1500. Health monitoring 1516 provides feedback to datacenter managers when problems are detected with servers, blades, processors, or applications in datacenter 1500 or when network bandwidth or communications issues arise.

Access control service 1517 determines whether users are allowed to access particular connections and services on cloud service 1500. Directory and identity management service 1518 authenticates user credentials for tenants on datacenter 1500.

Figure 16:
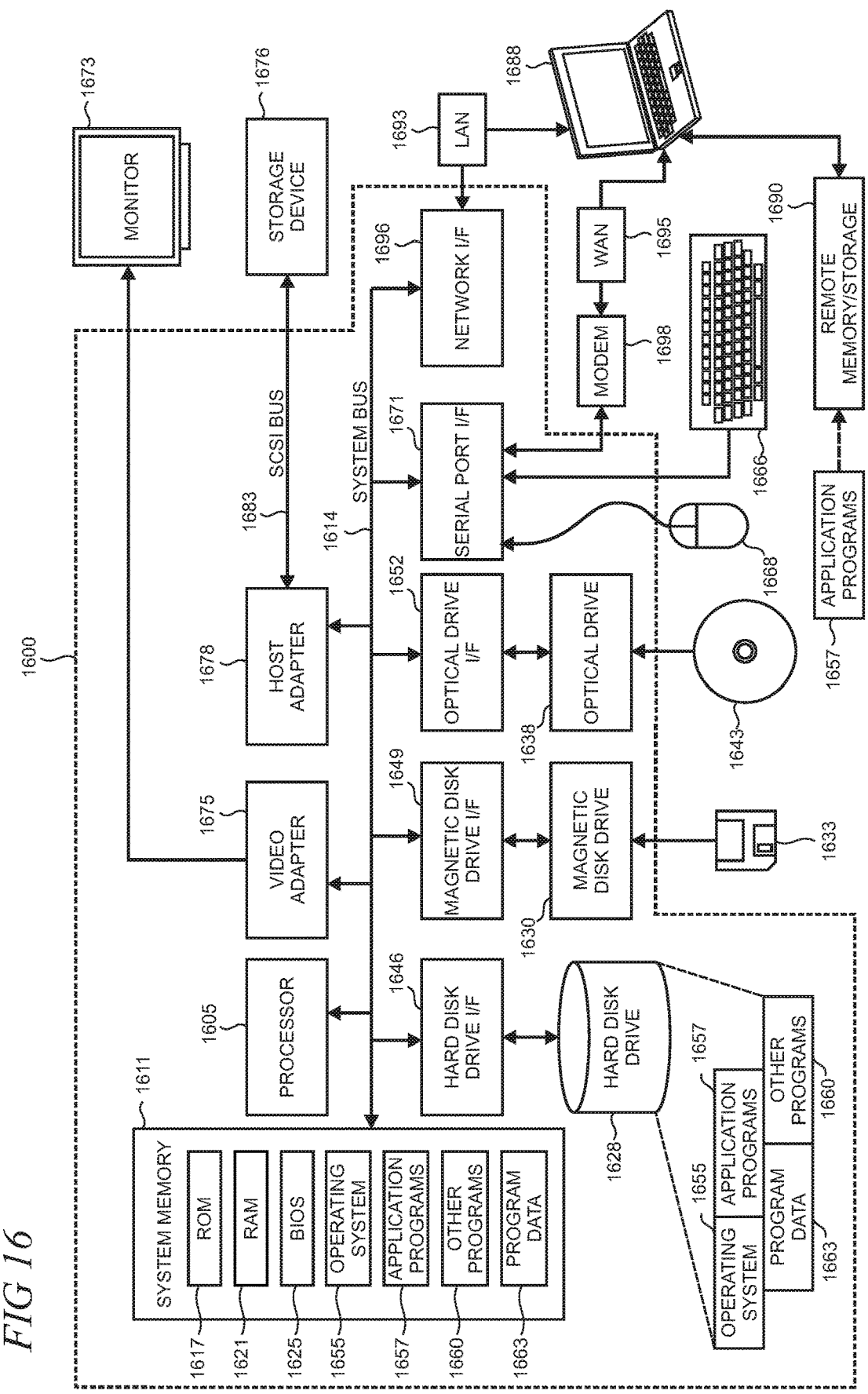
FIG. 16 is a simplified block diagram of an illustrative computer system that may be used at least in part to implement the present multi-tenant support on virtual machines in cloud computing networks.

FIG. 16 is a simplified block diagram of an illustrative computer system 1600 such as a PC, client machine, or server with which the present multi-tenant support on virtual machines in cloud computing networks may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present user and device authentication for web applications. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present user and device authentication for web applications.

Various exemplary embodiments of the present multi-tenant support on virtual machines in cloud computing networks are now presented by way of illustration and not as an exhaustive list of all embodiments. An example includes one or more processors; and at least one hardware-based non-transitory computer-readable memory having computer-executable instructions stored thereon which, when executed by the one or more processors, causes the computing system to implement a virtual machine on which a plurality of network containers is instantiated, each of the network containers encapsulating networking policies applicable to computing workloads hosted on the virtual machine, in which the computing workloads are mapped to respective network containers, associate each of the plurality of network containers with a single network interface controller (NIC) on the virtual machine, the NIC being configured to interface with a network switch, and at the network switch, process the computing workloads for each network container to enforce the networking policies using independent datapaths on the virtual machine, the processing including matching data packets in the computing workloads to one or more rules that express the networking policies.

In another example, each network container is associated with a different virtual network so that the virtual machine can belong to multiple virtual networks using the single NIC, and wherein the network containers may utilize overlapping IP (Internet Protocol) addresses. In another example, the network containers are associated with a plurality of tenants of the virtual machine to thereby implement multi-tenancy on the virtual machine, wherein each of the independent datapaths is associated with a respective different tenant. In another example, the network containers are associated with a single tenant of the virtual machine, and each network container is mapped to a different virtual network, wherein the tenant is switched between virtual networks by processing the computing workloads associated with a respective mapped network container. In another example, at least one of the network containers is utilized for a current virtual network, and at least one of the network containers is utilized as a pre-provisioned virtual network. In another example, networking policy is tied to discrete computing workloads that are processed by the network switch for a virtual machine, in which the network switch is a virtual switch that includes programmatically managed extensible capabilities, and which connects to the plurality of network containers and to underlying physical network infrastructure, the extensible capabilities at least including a virtual filtering platform that performs the processing using one or more match action tables. In another example, processing comprises evaluating a state of data packets comprising the workload to enforce networking policies per network contain rather than per virtual machine, in which the networking policies are expressed one or more rules for one of access control, metering, routing, tunneling, filtering, address translation, encryption, decryption, encapsulation, de-encapsulation, or quality of service.

A further example includes a method for supporting a multi-tenant cloud computing environment on a single virtual machine, comprising: implementing a networking port on the single virtual machine in a cloud computing environment; implementing a plurality of network containers on the virtual machine, in which the network containers are respectively associated with a plurality of tenants of the single virtual machine; associating data packets for computing workloads requiring networking on the virtual machine with each of the network containers, wherein each network container includes networking policy for the respective computing workload; separating networking policy for the port into layers so that data packets entering the virtual machine traverse each of the layers in succession, and data packets leaving the virtual machine traverse each of the layers in succession in a direction opposite that of the entering data packets; and processing the data packets per network container using isolated datapaths through the networking policy layers so that the single virtual machine supports networking for each of the plurality of tenants independently from the other tenants.

In another example, the networking policy determines packet routing or access control. In another example, the layers include non-intersecting groups of one or more networking rules, each group being uniquely associated with a given network container. In another example, a state of a data packet is evaluated at each layer and rules are mapped to the data packet based on the state. In another example, a single network interface controller provides a network interface for each of the network containers. In another example, each network container enables the virtual machine to belong to a different virtual network. In another example, each network container includes a unique IP (Internet Protocol) address or each network container uses a combination of IP address and network ID (identifier).

A further example includes one or more hardware-based non-transitory computer-readable memory devices storing computer-executable instructions which, upon execution by one or more processors in a computer server, cause the server to: create a virtual machine on which a plurality of discrete computing workloads for networking are hosted, the virtual machine utilizing at least a networking stack and compute stack during operations; operate multiple network containers on the virtual machine, in which the network containers include networking policies applicable to the computing workloads; utilize a floating network interface controller (NIC) that interfaces with each of network containers, in which the floating NIC is configured to minimize interactions between the networking and compute stacks after the virtual machine is created; and enforce the networking policies as data packets enter and exit the virtual machine through the floating NIC during the operations.

In another example, the instructions further cause the server to utilize a plug-in to a virtual machine switch on the virtual machine to enforce the networking policies. In another example, the instructions further cause the server to map the computing workloads to the network containers. In another example, the instructions further cause the server to process the computing workloads on the virtual machine using isolated datapaths. In another example, the instructions further cause the server to utilize the floating NIC to enable dynamic connectivity to multiple virtual networks without restarting the virtual machine. In another example, the instructions further cause the server to associate one or more of the network containers with different tenants to thereby implement a multi-tenant virtual machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for supporting a multi-tenant cloud computing environment on a single virtual machine, comprising:
   implementing, in a cloud computing environment, a virtual machine switch and the single virtual machine, the virtual machine switch providing a networking port to the single virtual machine;
   implementing a plurality of network containers on the single virtual machine, wherein each of the network containers is associated with a respective tenant of a plurality of different tenants of the single virtual machine;
   associating data packets of computing workloads requiring networking on the single virtual machine with each of the network containers, wherein each of the network containers respectively provides networking policy for computing workloads of the associated tenant;
   separating the networking policy provided by each of the network containers into layers on the virtual machine switch such that data packets entering the single virtual machine at the networking port traverse each of the layers in succession, and data packets leaving the single virtual machine at the networking port traverse each of the layers in succession in a direction opposite that of the entering data packets; and
   processing, using a packet processor disposed in the virtual machine switch, the data packets associated with each of the network containers using isolated datapaths through the networking policy layers to enforce the networking policy for the computing workloads of the associated tenant of the plurality of different tenants independently from other tenants.

2. The method of claim 1 in which the networking policy for the computing workloads determines packet routing or access control.

3. The method of claim 1 in which the layers include non-intersecting groups of one or more networking rules, each group being uniquely associated with a given network container.

4. The method of claim 3 in which a state of a data packet is evaluated at each layer and one or more networking rules are mapped to the data packet based on the state.

5. The method of claim 1 in which a single network interface controller provides a network interface for each of the network containers.

6. The method of claim 1 in which each network container enables the single virtual machine to belong to a different virtual network.

7. The method of claim 1, wherein each network container includes a unique Internet Protocol (IP) address or each network container uses a combination of IP address and network identifier.

8. A computing system for supporting a multi-tenant cloud computing environment on a single virtual machine, comprising:
   one or more processors; and
   at least one hardware-based non-transitory computer-readable memory having computer-executable instructions stored thereon which, when executed by the one or more processors, causes the computing system to
   implement, in a cloud computing environment, a virtual machine switch and the single virtual machine, the virtual machine switch providing a networking port to the single virtual machine;
   implement a plurality of network containers on the single virtual machine, wherein each of the network containers is associated with a respective tenant of a plurality of different tenants of the single virtual machine;
   associate data packets of computing workloads requiring networking on the single virtual machine with each of the network containers, wherein each of the network containers respectively provides networking policy for computing workloads of the associated tenant;
   separate the networking policy provided by each of the network containers into layers on the virtual machine switch such that data packets entering the single virtual machine at the networking port traverse each of the layers in succession, and data packets leaving the single virtual machine at the networking port traverse each of the layers in succession in a direction opposite that of the entering data packets; and
   process, using a packet processor disposed in the virtual machine switch, the data packets associated with each of the network containers using isolated datapaths through the networking policy layers to enforce the networking policy for the computing workloads of the associated tenant of the plurality of different tenants independently from other tenants.

9. The computing system of claim 8 in which the networking policies for the computing workloads determines packet routing or access control.

10. The computing system of claim 8 in which the layers include non-intersecting groups of one or more networking rules, each group being uniquely associated with a given network container.

11. The computing system of claim 10 in which a state of a data packet is evaluated at each layer and one or more networking rules are mapped to the data packet based on the state.

12. The computing system of claim 8 in which a single network interface controller provides a network interface for each of the network containers.

13. The computing system of claim 8 in which each network container enables the single virtual machine to belong to a different virtual network.

14. The computing system of claim 8, wherein each network container includes a unique Internet Protocol (IP) address or each network container uses a combination of IP address and network identifier.

15. One or more hardware-based non-transitory computer readable memory devices storing computer-executable instructions which, upon execution by one or more processors in a computer server, cause the server to:

implement, in a cloud computing environment, a virtual machine switch and a single virtual machine, the virtual machine switch providing a networking port to the single virtual machine;
 implement a plurality of network containers on the single virtual machine, wherein each of the network containers is associated with a respective tenant of a plurality of different tenants of the single virtual machine;
 associate data packets of computing workloads requiring networking on the single virtual machine with each of the network containers, wherein each of the network containers respectively provides networking policy for computing workloads of the associated tenant;
 separate the networking policy provided by each of the network containers into layers on the virtual machine switch such that data packets entering the single virtual machine at the networking port traverse each of the layers in succession, and data packets leaving the single virtual machine at the networking port traverse each of the layers in succession in a direction opposite that of the entering data packets; and
 process, using a packet processor disposed in the virtual machine switch, the data packets associated with each of the network containers using isolated datapaths through the networking policy layers to enforce the networking policy for the computing workloads of the associated tenant of the plurality of different tenants independently from other tenants.

16. The one or more hardware-based non-transitory computer-readable memory devices of claim 15 in which the networking policies for the computing workloads determines packet routing or access control.

17. The one or more hardware-based non-transitory computer-readable memory devices of claim 15 in which the layers include non-intersecting groups of one or more networking rules, each group being uniquely associated with a given network container.

18. The one or more hardware-based non-transitory computer-readable memory devices of claim 17 in which a state of a data packet is evaluated at each layer and one or more networking rules are mapped to the data packet based on the state.

19. The one or more hardware-based non-transitory computer-readable memory devices of claim 15 in which a single network interface controller provides a network interface for each of the network containers.

20. The one or more hardware-based non-transitory computer-readable memory devices of claim 15 in which each network container enables the single virtual machine to belong to a different virtual network.

\* \* \* \* \*